Dec. 29, 1970     H. NERWIN ET AL     3,551,045

SLIDE EXCHANGING DEVICE

Filed March 5, 1968     3 Sheets-Sheet 2

HUBERT NERWIN
FREDRICK W. KERN
INVENTORS

BY

ATTORNEYS

United States Patent Office 3,551,045
Patented Dec. 29, 1970

3,551,045
SLIDE EXCHANGING DEVICE
Hubert Nerwin and Frederick W. Kern, Rochester, N.Y.,
assignors to Eastman Kodak Company, Rochester,
N.Y., a corporation of New Jersey
Filed Mar. 5, 1968, Ser. No. 710,576
Int. Cl. G03b 23/06
U.S. Cl. 353—116                                    14 Claims

ABSTRACT OF THE DISCLOSURE

A slide exchanging device for use in a slide projector or the like adapted to simultaneously retract a slide laterally from a projection gate structure, and load another slide laterally into the gate structure. This action is accomplished by simultaneously moving both slides in opposite directions in overlapping relation to one another.

BACKGROUND OF THE INVENTION

The present invention relates to slide projectors or the like, and more particularly to slide exchanging means adapted to locate successive slides of a slide pack or magazine at a viewing position.

Various types of equipment, including slide projectors, slide viewers and data storage and retrieval apparatus, are provided with means whereby successive slides of a slide pack or magazine may be moved in sequence into a gate aligned with an optical system or the like adapted to display or to otherwise derive information from the particular slide located within the gate. The simplest type of slide changing device employed in such equipment includes means for supporting a slide magazine laterally adjacent the gate, and means whereby each slide is shifted laterally into the gate and thereafter returned to its former position in the magazine, whereupon the magazine is advanced to position the succeeding slide for similar movement into and out of the gate.

Since this type of slide changing system inherently produces a considerable delay between the positioning of successive slides in the gate, more elaborate devices were developed whereby the succeeding slide is previously aligned with the slide in the gate before the slide changing process is effected. By this means, the two slides are moved simultaneously in the same direction in tandem fashion, and as one is removed from one side of the gate, the other is installed in the gate from the opposite side. However, to preserve the sequential arrangement of the slides, the use of such a system requires a relatively complicated mechanism for controlling magazine units at opposite sides of the gate. Furthermore, due to the inertia of the slide supporting and transferring structure involved, it is impractical even in such a system to transfer the slides with sufficient speed to prevent any visible interruption between successive slide images on a projection screen.

SUMMARY OF THE INVENTION

The present invention is directed to slide projectors or the like of the type in which successive slides in a slide pack or magazine are moved into a gate and thereafter returned to the same pack or magazine. As compared to previously known similar devices, the subject mechanism is not complicated, while nevertheless affording reliable and substantially instantaneous replacement of the slides in the gate. In brief, these advantages are accomplished by a new approach to the general mode of operation of such a system, whereby a slide being moved laterally into the gate in one direction is in overlapping relation to the slide simultaneously being removed from the gate by lateral movement in the opposite direction. Thus, rather than being changed by moving in tandem relation through the gate, the slides are "exchanged" by simultaneous sliding movement in opposite directions within the gate. In addition to affording very rapid exchanging of the slides, this system also substantially simplifies the construction of the overall system by eliminating the need for supplemental slide carrier members or the like, thereby further increasing the speed of operation of the system by eliminating the inertia of such movable members. Also, the subject construction materially simplifies moving the magazine incrementally relative to the gate; this function being performed simply by stationary surfaces engageable with successive slides of the pack or magazine under the influence of a resilient feeder member adapted to urge the pack or magazine in a given direction.

Various means for practicing the invention and other advantages afforded thereby will be apparent from the following detailed description of an illustrative preferred embodiment thereof, reference being made to the accompanying drawings in which like reference numerals refer to like elements. In this embodiment, a slide projector according to the present invention is adapted to receive and display a plurality of slides assembled into a slide pack held together by a corner pivot rod. Further details of such slide packs are disclosed in commonly assigned copending U.S. patent application Ser. No. 667,157, entitled Corner Pivot Slide Mounts for a Slide Projector, and filed in the name of John H. Eagle on Sept. 12, 1967. Also, another type of slide projector adapted to utilize such slide packs is disclosed in commonly assigned U.S. patent application Ser. No. 667,157, entitled Advance Mechanism for Corner Pivot Slides, and filed in the name of Hubert Nerwin on Sept. 12, 1967. It should be understood, however, that the invention is equally applicable to projectors or related devices adapted to accommodate more conventional types of slides and slide magazines.

Figure 1:
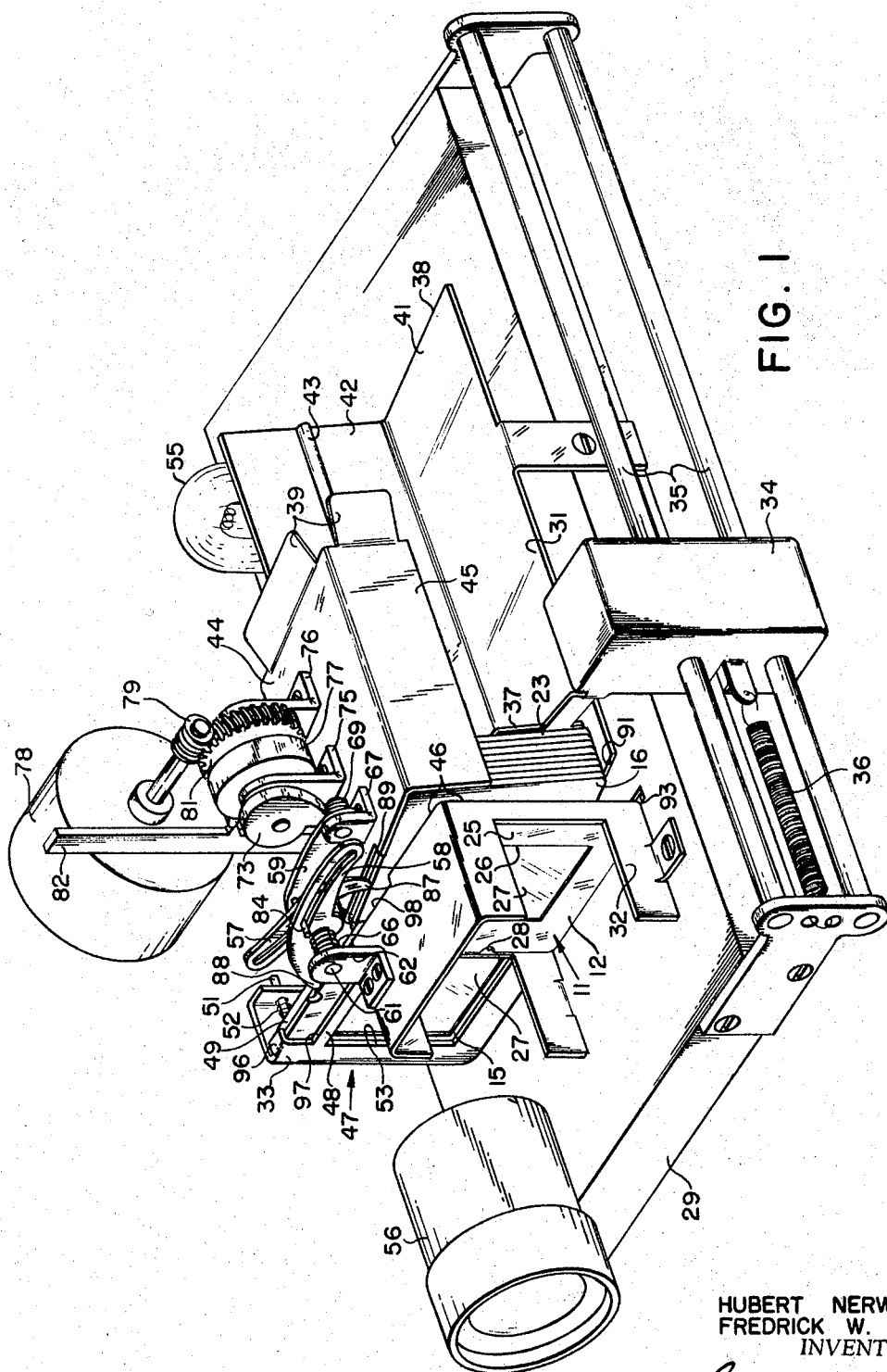
FIG. 1 is a perspective view of the basic structure of a slide projector according to the above-mentioned preferred embodiment of the invention.
Figure 2:
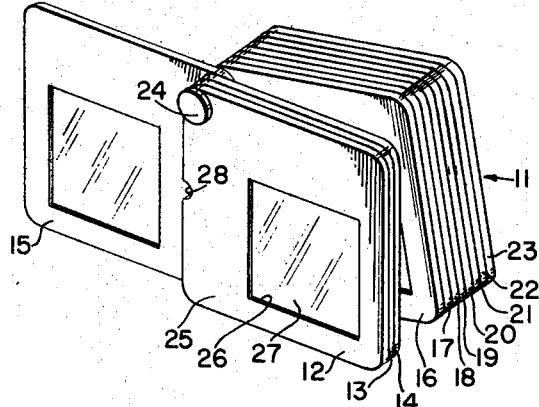
FIG. 2 is a perspective view of one type of slide pack used in the projector depicted in FIG. 1.

As best illustrated by FIGS. 1 and 2, the illustrated projector is adapted to receive a slide pack 11 comprising a plurality of slides 12–23, inclusive, such slides being pivotally mounted on a pivot rod 24 extending through one corner of the pack as explained in detail in the above-identified pending patent applications. Each of the slides includes a generally rectangular frame member 25 provided with an aperture 26 within which is supported a photographic transparency 27 or the like. Also, each slide is provided with an edge notch 28, at a predetermined position relative to the aperture and the pivot rod hole of the slide. Accordingly, when the slides are properly assembled in the pack and oriented in stacked relation to one another, all of the transparencies and all of the edge notches are in mutual alignment.

The illustrated projector comprises a base member 29 on which is mounted a tilted rear channel member 31, a horizontal front channel member 32, and a film gate structure 33. These three members are positioned relative to one another such that different slides of the same slide pack can be located simultaneously within each member. For example, FIGS. 1 and 2 show the relative positions assumed by the illustrated slides when slides 12–14 are located in the front channel member, slide 15 in the gate structure and slides 16–23 in the rear channel member.

To load the projector, feeder block 34 is manually retracted along support bars 35 against the influence of spring 36 to a position in which feeder arm 37 is adjacent the rear edge 38 of the rear channel member, well beyond guide lips 39. The slide pack is then positioned forwardly of feeder arm 37 adjacent wall members 41 and 42 of the rear channel member so that ridge 43 is received in the aligned edge notches 28 of the pack, whereupon the pack can be slid forwardly past guide lips 39 and along channel wall members 44 and 45. If the pack is improperly oriented, ridge 43 prevents it from sliding past the guide lips, thereby insuring that the projector cannot be loaded incorrectly.

By way of a brief introduction to the general mode of operation of the loaded projector, it will be apparent from FIG. 1 that as the slide pack is urged forwardly in rear channel member 31 by resiliently biased feeder arm 37, all of the slides are tilted out of alignment with front channel member 32. Therefore, the front surface of slide 12 will abut against the rearward edges 46 of front channel member 32 to obstruct temporarily further forward movement of the pack by the feeder arm. When so positioned, however, slide 12 is laterally aligned with gate structure 33 and with the slide exchanging mechanism hereinafter described in greater detail. This mechanism is adapted to laterally engage slide 12 and to move it into the gate by rotating it about pivot rod 24 in a clockwise direction as viewed in FIG. 1. As such rotational movement of slide 12 moves it out of engagement with edges 46 of the front channel member, the entire pack is moved forwardly by feeder arm 37 to bring slide 13 into contact with those same edges. Subsequently, as slide 13 is rotated into the gate in the same manner, the slide exchanging mechanism simultaneously rotates slide 12 in the opposite direction and into front channel member 32. By repeating this process, therefore, each slide, in turn, is installed in and removed from the gate. When the entire pack has been thus transferred to front channel member 32, the pack is removed therefrom and a new pack is loaded into the projector as previously described.

Figure 3:
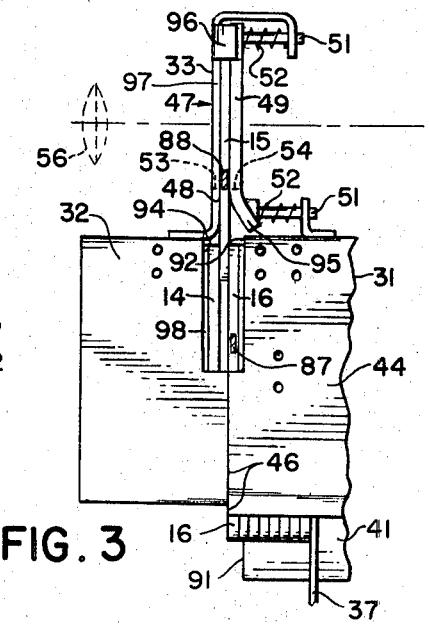
FIG. 3 is a partial top plan view of a portion of the projector shown in FIG. 1 showing a slide located in projection position in the slide gate, with various elements of the projector structure omitted for purposes of clarity.

Referring now to the more specific details of the subject construction, the gate structure 33 includes a gate member 47 rigidly secured to one side of channel member 32. By reference to FIGS. 1 and 3, it will be seen that front wall portion 48 of gate member 47 is located slightly ahead of and in parallel relation to the plane defined by the rear edges 46 of front channel member 32. Behind this front wall portion of gate member 47, a pressure plate 49 is supported on pins 51 and is urged forwardly by springs 52. Rectangular apertures 53 and 54 are provided in front wall portion 48 of the gate member and in pressure plate 49, respectively, and are aligned with the optical system of the projector represented by lamp 55 and objective lens system 56. Accordingly, a slide located within gate structure 47 is resiliently supported against the rearward surface of front wall portion 48 of the gate member by pressure plate 49, as illustrated in FIG. 3, with the transparency member of the slide in alignment with the two apertures 53, 54, so that an image of the transparency can be focused on a projection screen by lens system 56.

Figure 6:
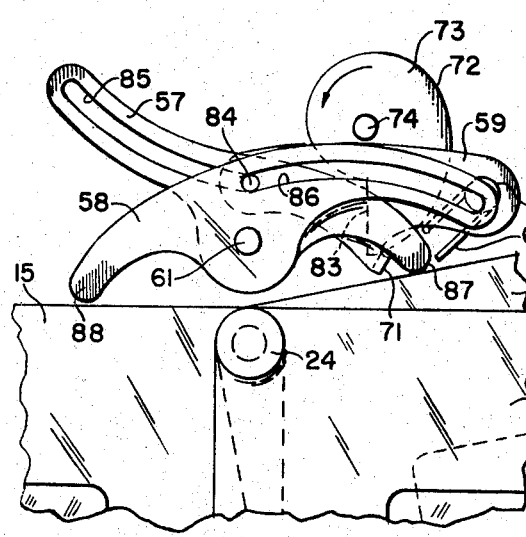
FIG. 6 is a simplified fragmentary front elevational view of the slide exchanging mechanism of the subject projector, showing the respective positions of the cam and arms thereof in relation to the slide pack at the stage of operation shown in FIGS. 1 and 3.
Figure 7:
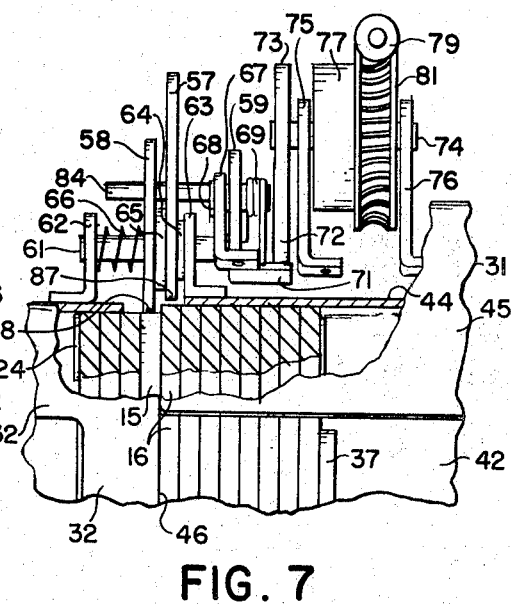
FIG. 7 is a simplified and partially cross sectioned side elevational view of the slide pack and the slide exchanging mechanism at the stage of operation shown in FIGS. 1, 3 and 6.

The slide exchanging mechanism is supported on top of the two channel members 31, 32, and comprises a slide loading arm 57, a slide retracting arm 58 and a driving arm 59, such arms being shown in FIGS. 1, 6 and 7 in their respective positions prior to the initiation of a slide exchanging operation. The slide loading and retracting arms are pivotally movable about a common axis defined by shaft 61, which is rotatably supported between brackets 62 and 63. Arm 57 is affixed to shaft 61 by means of collar 64, whereas arm 58 is rotatably supported on the shaft by bushing 65. A light coil spring 66 surrounding shaft 61 between bracket 62 and arm 58 maintains the two arms 57 and 58 in fixed spaced relation to one another and resiliently urges them to the rearward position defined by the engagement of collar 64 with bracket 63, as best shown in FIG. 7.

Behind arms 57 and 58, driving arm 59 is rotatably attached to bracket 67 by stud 68. This arm is biased in a clockwise direction, as viewed from the front, by a relatively stiff spring 69, thereby maintaining rearwardly projecting lug 71 in contact with the peripheral surface 72 of rotatable cam 73. The cam, in turn, is mounted on shaft 74 rotatably supported between brackets 75 and 76, and is driven in a counterclockwise direction through a conventional single revolution clutch 77 connected to motor 78 by worm 79 and pinion 81. Since single revolution clutches are well-known devices, the details of the clutch mechanism are not shown, the only explanation necessary in this regard being that each operation of latch level 82 causes the cam to rotate through a single revolution and to stop at the position illustrated in FIGS. 1 and 6. Thus, almost immediately after rotation of cam 73 is initiated in the direction of the arrow, the radial edge 83 of peripheral cam surface 72 moves past lug 71, thereby allowing driving arm 59 to be moved instantly to the raised position shown in FIG. 8 under the influence of spring 69. As cam 73 continues to rotate, however, lug 71 is moved gradually away from the axis of shaft 74 by cam surface 72 so that driving arm 59 is restored to its initial position upon completion of a single revolution of the cam.

At the outer end of driving arm 59, a driving pin 84, projects rearwardly therefrom and is received in elongate slots 85 and 86 in the overlapping upper end portions of arms 57 and 58. The respective opposite lower end portions of the slide loading and retracting arms define end lobes 87 and 88. Accordingly, it will be seen that upward movement of driving pin 84 about the axis of stud 68 will effect simultaneous counterrotational movement of arms 57 and 58 resulting in downward converging movement of their end lobes, such movement of lobe 87 being accommodated by notch 89 (see FIG. 1) in the rear channel member. Similarly, angular movement of driving pin 84 in a downward direction will result in the opposite simultaneous rotation of arms 57 and 58. Thus, during each revolution of the cam, arms 57 and 58 are initially rotated very rapidly from the normal positions shown in FIGS. 1, 6 and 7 to the positions shown in FIGS. 8 and 9, and are thereafter returned relatively slowly to their initial angular positions.

Figure 4:
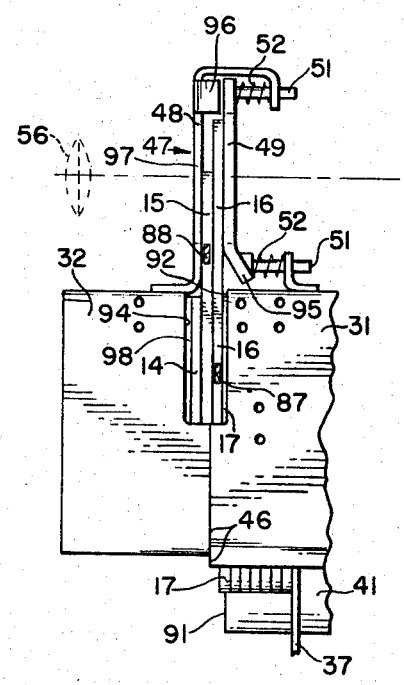
FIG. 4 corresponds to FIG. 3 and illustrates the depicted projector components during the subsequent slide exchanging operation while two slides are in overlapping relation within the gate.
Figure 8:
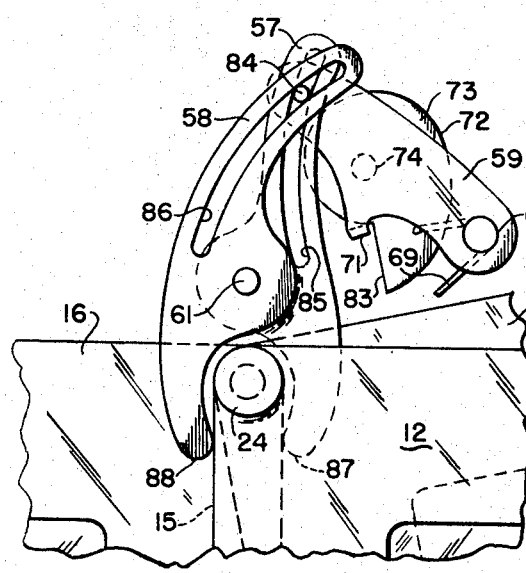
FIG. 8 corresponds to FIG. 6 and shows the respective positions of the illustrated slides and projector elements at the stage of the slide exchanging process depicted in FIG. 5.
Figure 9:
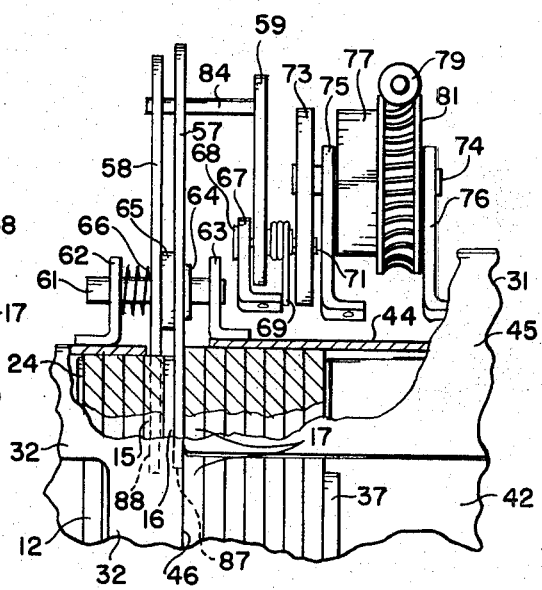
FIG. 9 corresponds to FIG. 7 and shows the respective positions of the illustrated slides and projector elements at the stage of operation depicted in FIGS. 5 and 8.

FIGS. 1, 3, 6 and 7 illustrate the respective positions of the depicted slides and projector components during the projection of slide 15 after completion of the operating cycle during which that slide was installed in the projector gate. At this stage of operation of the projector, lobe 87 of slide loading arm 57 extends into notch 89 and is closely adjacent the top edge of slide 16, which is resiliently urged against the rear edges 46 of front channel member 32 by the resiliently biased feeder bar 37 engaged with the last slide in the slide pack. Except for its frictional engagement with edges 46, slide 16 is free to rotate into the gate structure in a clockwise direction past the rearwardly recessed front edge surfaces 91 and 92 of the rear channel member 31 and through slot 93 in base member 29. However, slides 17–23 are positioned rearwardly beyond the recessed edges 91 and 92 of the rear channel member and therefore cannot rotate about the pivot rod. Concurrently, lobe 88 of slide retracting arm 58 is located immediately above the upper edge of slide 15 positioned within the projector gate structure. This slide is frictionally retained in position by being sandwiched between gate member 47 and pressure plate 49, but is otherwise rotatable in a counterclockwise direction out of the gate and into the front channel member, past the forwardly recessed edge 94 of the latter member and through slot 93 Therefore, when arms 57 and 58 suddenly move toward their respective positions illustrated in FIGS. 8 and 9, in response to rotation of cam 73, slides 15 and 16 are rotatably driven in opposite directions to one another by the corresponding lobes 87 and 88. As such rotation of slide 16 causes it to begin to enter the gate laterally, it engages the sloped edge 95 of pressure plate 49 and cams the pressure plate rearwardly to allow portions of both slide 15 and slide 16 to be positioned momentarily between the pressure plate and the front gate member as shown in FIG. 4. When arm lobes 87, 88 have reached their lowermost positions as depicted in FIGS. 8 and 9, however, slide 15 has been removed entirely from the gate and replaced by slide 16, which is prevented from rotating beyond its proper projection position by stop ear 96 at the top edge of the gate member. Consequently, the entire slide pack is now advanced forwardly by feeder arm 37 to a position in which the succeeding slide 17 is engaged with edges 46 of the front channel member and in which slide 16 is pressed against gate member 48 by pressure plate 49.

Figure 5:
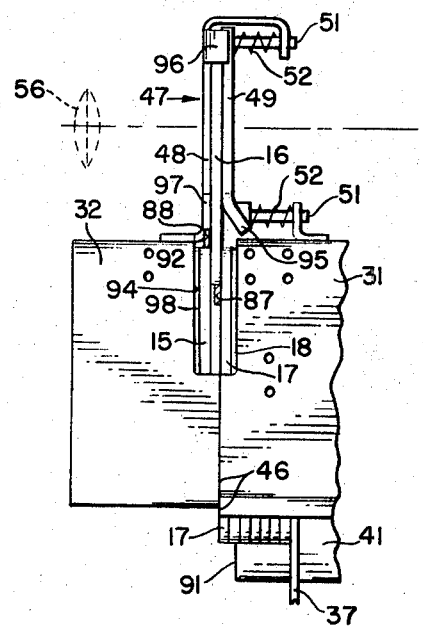
FIG. 5 corresponds to FIGS. 3 and 4 and illustrates the depicted projector components at a further stage of the slide exchanging process, after the next slide is in projection position in the gate but before the slide exchanging mechanism has been restored to its initial condition shown in FIG. 4.

The end lobes 87 and 88 of arms 57 and 58 respectively have not yet been returned to their initial positions when such forward advancement of the slide pack takes place. Therefore, the light coil spring 66 is adapted to allow arms 57 and 58 to be moved forwardly as shown in FIGS. 5 and 9 as lobe 87 is engaged by the adjacent front face of slide 17. To accommodate such movement of the arms, the gate member 47 is provided with a notch 97 adapted to receive lobe 88 of arm 58; lobe 87 of arm 57 being similarly received within notch 98 of the front channel member 32. Hence, the slide pack assumes its advanced position immediately following the downward movement of end lobes 87, 88 of the slide loading and retracting arms, which are then gradually raised by further rotation of cam 73 while the slide in the gate is being displayed. By the time cam 73 completes its revolution, the lobes 87, 88 have been moved upwardly beyond the top edges of slides 16 and 17, thereby allowing the slide exchanging mechanism to be restored to its initial condition as spring 66 returns arms 57 and 58 to their former rearward positions. Thus, lobes 87 and 88 are now respectively aligned with the top edges of slides 17 and 16 so that the next slide exchanging operation can be initiated by means of latch lever 82, which obviously can be operated either manually or by automatic or remote control means.

While the foregoing description covers only a single slide exchanging operation involving two intermediate slides within a slide pack, it should be apparent that the mechanism operates in essentially the same manner to install the first slide of the pack in the gate and thereafter to display all of the available slides in consecutive sequence. Also, it should be recognized that the time interval required to exchange two slides is unrelated to the speed of rotation of the cam, which in effect serves merely to cock the spring operated slide loading and retracting arms before a slide exchanging operation is initiated. For example, in a relatively unrefined experimental embodiment of the invention employing a cam adapted to complete a single revolution in several seconds, the time interval required for the actual slide exchanging operation was found to be only a fraction of a second. Since such a brief interval is considerably beyond the average range of conscious visual perception, the successive images projected on a screen appear to follow one another without any distractive interruption. Nevertheless, it would appear that even faster operation could be achieved by the same type of mechanism, as might be desirable in high speed data storage and retrieval equipment, such speeds being limited only by the mechanical strength required of the slides and the moving mechanism elements to withstand the inertial forces to which they are subjected.

Although the foregoing description relates to a specific embodiment of the invention, it is obvious that variations and modifications thereof can be effected within the spirit and scope of the invention. Accordingly, the present disclosure is to be considered as illustrative and not as limiting the scope of the invention which is defined by the following claims.

We claim:

1. A device for exchanging slides in a gate structure comprising means including tensioned means adapted when released to simultaneously move first and second slides toward one another in overlapping relation, one of said first and second slides being moved out of said gate structure while the other of said slides is moved into said gate structure.

2. A device having a gate structure for a slide and slide storing means laterally spaced therefrom, comprising means including tensioned means adapted when released to simultaneously move slides toward one another in overlapping relation between said gate structure and said slide storing means.

3. A device for exchanging slides in a gate structure, said device comprising means including tensioned means adapted when released to laterally move a first slide out of said gate structure in one direction, and to simultaneously move a second slide laterally into said gate structure in the opposite direction in overlapping relation to said first slide.

4. A device according to claim 3 in which said means comprises:
   a movable slide retracting member in its normal position engageable with a lateral edge of said first slide within said gate structure,
   a movable slide loading member in its normal position engageable with a lateral edge surface of said second slide beyond said gate structure, and
   a mechanism coupled to said tensioned means for simultaneously moving both of said members in opposite directions from their normal positions to thereby effect corresponding lateral mrovement of the respective first and second slides out of and into said gate structure.

5. A device according to claim 4 in which said tensioned means includes resilient spring means connected to said members and adapted when released from a tensioned condition for simultaneously moving said members in opposite directions from their normal positions, and power operated means for returning said members to their normal positions and said resilient spring means to its tensioned condition.

6. In a slide projector including a mechanism operable to remove a first slide from a gate structure and to install a second slide in said gate structure in response to movement of an element of said mechanism from a first position to a second position, the improvement in means for operating said mechanism comprising:
   resilient means for biasing said element toward said second position,
   means for moving said element from said second position to said first position in opposition to said resilient means,
   latch means for retaining said element in said first position in opposition to said resilient means, and
   means for releasing said latch means to allow movement of said element moving means and substantially instantaneous movement of said element from said first position to said second position by said resilient means.

7. In a slide projector adapted to accommodate at least two slides supported within said projector for independent lateral pivotal movement into and out of a gate structure about a pivot axis adjacent said gate structure, a slide exchanging device comprising:
   slide loading means movable to rotate a first one of said slides about said pivot axis in a first direction to move said first one of said slides laterally into said gate structure,
   slide retracting means movable to rotate a second one of said slides about said pivot axis in a second direction opposite said first direction to move said second one of said slides laterally out of said gate structure, and
   driving means including resilient means for effecting concurrent movement of said slide loading and retracting means to simultaneously move said first and second ones of said slides respectively into and out of said gate structure in overlapping counterrotating relation to one another.

8. The invention defined by claim 7 in which said driving means includes:
   a driving member operatively connected to said slide loading and retracting means to produce such concurrent movement thereof in response to movement of said driving member from a first position to a second position,
   said resilient means biasing said driving member from said first position toward said second position, and
   means for releasably retaining said driving member in said first position against the influence of said resilient means.

9. The invention defined by claim 7 in which said slide loading and retracting means include a slide loading arm and a slide retracting arm both supported for rotational movement about a common rotational axis adjacent and parallel to said pivot axis, said slide loading and retracting arms being engageable respectively with said edge surfaces of said first and second ones of said slides.

10. The invention defined by claim 9 in which said driving means comprises a movable driving member operatively connected to both of said arms to produce simultaneous counterrotational movement of said arms in response to movement of said driving member.

11. A slide projector adapted to accommodate a slide pack comprising a plurality of flat substantially rectangular image bearing slides pivotally supported in stacked relation by an elongate pivot rod extending through corresponding corners of said slides and to display consecutive images of successive ones of said slides comprising said slide pack received by said projector, said projector comprising:
   an optical system, a gate structure adapted to support a slide received therein for display by said optical system,
   guide means for receiving said slide pack accommodated by said projector and for supporting slides of said slide pack for movement along a path parallel to the axis of said pivot rod and laterally adjacent said gate structure,
   feeding means for moving said pack incrementally along said path to position successive ones of said slides in lateral alignment with said gate structure,
   a slide loading member adapted to engage an edge surface of a first slide of said slide pack positioned in lateral alignment with said gate structure, said slide loading member being movable toward said gate structure to rotate said first slide engaged thereby about said pivot rod in a first direction to move said first slide laterally out of said guide means and into said gate structure,
   a slide retracting member adapted to engage an edge surface of a second slide of said slide pack supported within said gate structure, said slide retracting member being movable toward said guide means to rotate said second slide engaged thereby about said pivot rod in a second direction opposite said first direction to move said second slide laterally out of said gate structure and into said guide means, and
   driving means including first resilient means for simultaneously imparting movement to said slide loading and retracting members to move said first and second slides engaged thereby concurrently in said first and second directions in overlapping relation to one another.

12. The invention defined by claim 11 in which said feeding means includes:
   second resilient means adapted to urge slides of said slide pack accommodated by said projector along said path toward said gate structure, and
   stationary abutment means engageable by said first slide of said slide pack and adapted to obstruct movement of said slide pack by said second resilient means, said first slide being movable out of engagement with said abutment means by movement of said slide loading member toward said gate structure.

13. The invention defined by claim 11 in which said driving means comprises a driving arm movable by said first resilient means and operatively connected to said slide loading member and to said slide retracting member to simultaneously move said members respectively toward said gate structure and toward said guide means in response to movement of said driving arm from a first position to a second position by said first resilient means, and to move said members simultaneously in the respective opposite directions in response to movement of said driving arm from said second position to said first position.

14. The invention defined by claim 13 including:
   a spring adapted to move said driving arm from said first position to said second position,
   a rotatable cam having a normal position,
   power operated means for unidirectionally rotating said cam,
   clutch means interposed between said cam and said power operated means,
   control means for said clutch means for selectively limiting the rotation of said cam by said power operated means, to a single revolution from said normal position, and
   cam follower means operatively connecting said cam with said driving arm to successively allow movement of said driving arm to said second position by said spring, and to effect movement of said driving arm to said first position in opposition to said spring upon rotation of said cam by said power operated means through said single revolution.

References Cited
UNITED STATES PATENTS 1,108,935    9/1914    Schwanhausser _____ 353—92

HARRY N. HAROIAN, Primary Examiner